US012724582B2

(12) United States Patent
Fitze et al.

(10) Patent No.: US 12,724,582 B2
(45) Date of Patent: Sep. 1, 2026

(54) SYSTEMS, APPARATUSES, AND METHODS FOR REAL-TIME COLLABORATION WITH A GRAPHICAL RENDERING PROGRAM

(71) Applicant: DENTSPLY SIRONA Inc., York, PA (US)

(72) Inventors: Thomas Fitze, Winterthur (CH); Sascha Scandella, Zürich (CH); Martin Thuerer, Wiesendangen (CH)

(73) Assignee: Dentsply Sirona Inc., York, PA (US)

( * ) Notice: Subject to any disclaimer, the term of this patent is extended or adjusted under 35 U.S.C. 154(b) by 337 days.

(21) Appl. No.: 18/232,446

(22) Filed: Aug. 10, 2023

(65) Prior Publication Data

US 2025/0053367 A1 Feb. 13, 2025

(51) Int. Cl.
*G06F 3/14* (2006.01)
*G06T 11/00* (2026.01)

(52) U.S. Cl.
CPC ............ *G06F 3/1454* (2013.01); *G06T 11/00* (2013.01)

(58) Field of Classification Search
None
See application file for complete search history.

(56) References Cited

U.S. PATENT DOCUMENTS 11,023,094 B2 6/2021 Dacosta
2007/0198744 A1 8/2007 Wensley
2014/0229865 A1 8/2014 Da Costa et al.
2014/0325073 A1 10/2014 Urbach
2016/0110903 A1* 4/2016 Perrin .................... G06T 11/60 345/634
2018/0178132 A1* 6/2018 Ahlstrom ................ A63F 13/87
2020/0051030 A1 2/2020 Lebaredian et al.
2023/0256345 A1* 8/2023 Bao ....................... A63F 13/355 463/42

FOREIGN PATENT DOCUMENTS

EP 3790023 A1 3/2021

OTHER PUBLICATIONS

Sung-Soo, Kim et al.; "Multi-view Rendering Approach for Cloud-based Gaming Services"; AFIN 2011: The Third International Conference on Advances in Future Internet.
Fiedler, Glen; "Deterministic Lockstep" Article; Networked Physics; Nov. 29, 2014; https://gafferongames.com/post/deterministic_lockstep/.

(Continued)

*Primary Examiner* — Yanna Wu
(74) *Attorney, Agent, or Firm* — SCHWEGMAN LUNDBERG & WOESSNER, P.A.

(57) ABSTRACT

Systems, apparatuses, and methods are provided enabling real-time collaboration with a graphical rendering program. A server computer executes a graphical rendering program that determines an application state that defines a visual object. Rendering data is generated for one or more views of the visual object based on the application state. The rendering data is transmitted to client computer devices connected to the server such that the client computer devices can display the views of the visual object. As the application state defining the visual object is determined on the server computer, displays of the visual object on all client computer devices can be updated in real-time.

11 Claims, 3 Drawing Sheets

(56) References Cited

OTHER PUBLICATIONS

"Fast-Paced Multiplayer (Part I): Client-Server Game Architecture"; Gabriel Gambetta 2022; https://gabrielgambetta.com/client-server-game-architecture.html.
"Autodesk Formlt"; https://www.youtube.com/watch?v =_c9Lcl0OZX0; Oct. 28, 2014.
Onshape site; https://cad.onshape.com/help/Content/EnterpriseHelp/Content/EnterpriseLandingPage.htm; Sep. 1, 2023.
"International Application Serial No. PCT US2024 039314, International Search Report mailed Nov. 6, 24", 4 pgs.
"International Application Serial No. PCT US2024 039314, Written Opinion mailed Nov. 6, 24", 8 pgs.

* cited by examiner

SYSTEMS, APPARATUSES, AND METHODS FOR REAL-TIME COLLABORATION WITH A GRAPHICAL RENDERING PROGRAM

BACKGROUND

Field of the Invention

Embodiments of the invention generally relate to systems and methods that allow for real-time collaboration amongst users working with a graphical rendering program.

Related Art

Graphical rendering programs that allow users to work together on a visual project are valuable tools. Collaborative working promotes teamwork, creativity, and productivity. With collaborative graphical rendering programs, users can work on different aspects of a visual project, provide immediate feedback to each other, and make instant modifications, all of which lead to better results.

Desynchronization of the rendering instances of a visual project is a problem that can arise when users attempt to work together with a graphical rendering program in real-time. The desynchronization problem occurs when application states of two or more users diverge. For example, when a user causes a change of the application state for his/her view, that change to the application state may not communicated to the application state of a second user before the second user changes their application state for his/her view. As another example, a state change made by one user is not exchanged or applied correctly to the application state of another user, which results in an inconsistency between the users. In these examples the users' application states can become desynchronized. Such desynchronization can have a negative impact on a user's experience by preventing true real-time collaboration.

There have been attempts in the art to address the desynchronization problem amongst a group of users attempting to collaborate in real-time. The prior art attempts are generally directed at improving the efficiency of synchronization between independent rendering programs on each user's computer.

European Patent Application Publication No. 3 790 023 describes a method of analyzing medical image data in a virtual, multi-user collaboration. The system uses medical image data that is shared by all users. Users may change the shared medical image data, and the other users thereafter receive the changed medical image data. An isolated copy of the shared medical image data is provided to each user's workspace, and each user's workspace generates a visualization of the medical image data.

U.S. Pat. No. 11,023,094 describes a collaborative, multi-user system for viewing, rendering, and editing three-dimensional assets. Each client in the system maintains an up-to-date copy of the relevant project state. The system uses progressive rendering to provide incremental updates to the rendering clients of the users. When project data is modified or added by a client, the client's update is transmitted to an application server, the application server processes and distributes the updates to other clients in the session, and each client then adjusts its copy of the project state to reflect the changes.

U.S. Patent Application Publication No. 2007/0198744 describes a system, method, and computer program product for concurrent collaboration of media. The publication describes a plurality of clients that each include a communication system for receiving a media resource and for receiving collaboration messages. The clients also each include a rendering system for producing a rendering of the media resource in substantial synchronization with the other clients. In this system, a collaboration message is transmitted by one of the clients, with the collaboration message including a desired reference of the rendering. The other clients receive the collaboration message and synchronize their respective renderings of the media resource at the desired reference.

Sung-Soo Kim et al., "Multi-view Rendering Approach for Cloud-based Gaming Services" AFIN 2011: The Third International Conference on Advances in Future Internet, describes a system with an architecture that includes a distributed service platform (DSP), a distributed rendering service (DSR), and an encoding/QoS/streaming (EQS) to provide multiple viewpoints for multi-user games. With the depicted configuration, the application state determination is split between the DSP and DSR, which could lead to synchronization problems.

While the techniques described in the noted patent documents are said to provide real-time collaboration, desynchronization of the rendering between the users may still occur because of the requirement in the systems and methods that the graphical rendering program render a visual object at each user's computer. Such desynchronization significantly impairs real-time collaboration, and desynchronization makes some collaborative visualizations not possible, for example, when a significant data set is modified.

What is needed is a system providing a graphical user program and enables shared views such that users may view render instances of a visual object in real-time. Such a system would foster collaboration and eliminate the need for physical proximity.

SUMMARY OF THE INVENTION

According to one aspect of the invention, a system provides a visual object. The system includes a server computer comprising at least one processor and at least one memory that are configured to execute a graphical rendering program, the graphical rendering program determining an application state that defines the visual object, with rendering data for one or more views of a visual object being generated based on the application state. The system also includes a first client computer device including a display device, at least one processor, and at least one memory, the first client computer device being connected to the server computer through a network such that the first client computer device can receive the rendering data from the server computer, the first client computer being configurable to provide a display of the visual object on the display device based on the rendering data received from the server computer without determining an application state for the visual object. The system further includes a second client computer device including a display device, at least one processor, and at least one memory, the second client computer device being connected to the server computer through the network, the second client computer being configurable to provide a display of view of the visual object on the display device based on the rendering data received from the server computer without determining an application state for the visual object.

According to another aspect of the invention, a server computer is provided. The server computer includes at least one processor configured to read out and execute instructions stored in at least one memory to thereby cause the server computer to execute a graphical rendering program that determines an application state that defines a visual object; generate rendering data for one or more views of a visual object based on the application state, the rendering data being such that a client computer device can display the visual object without the computer device determining the application state; transmit the rendering data to a plurality of client computer devices; and receive commands from at least one of the plurality of client computer devices to change the application state.

According to yet another aspect of the invention, a method is provided for displaying a visual object on computer devices. The method includes initiating a graphical rendering program on a server computer, the graphical rendering program determining an application data for the visual object; generating rendering data for one or more views of the visual object based on the application state; transmitting the rendering data to a first client computer device and a second client computer device; and displaying a view of the visual object on display devices of the first and second client computer devices without the first and second client computer determining an application state for the visual object.

DETAILED DESCRIPTION OF THE INVENTION

Figure 1:
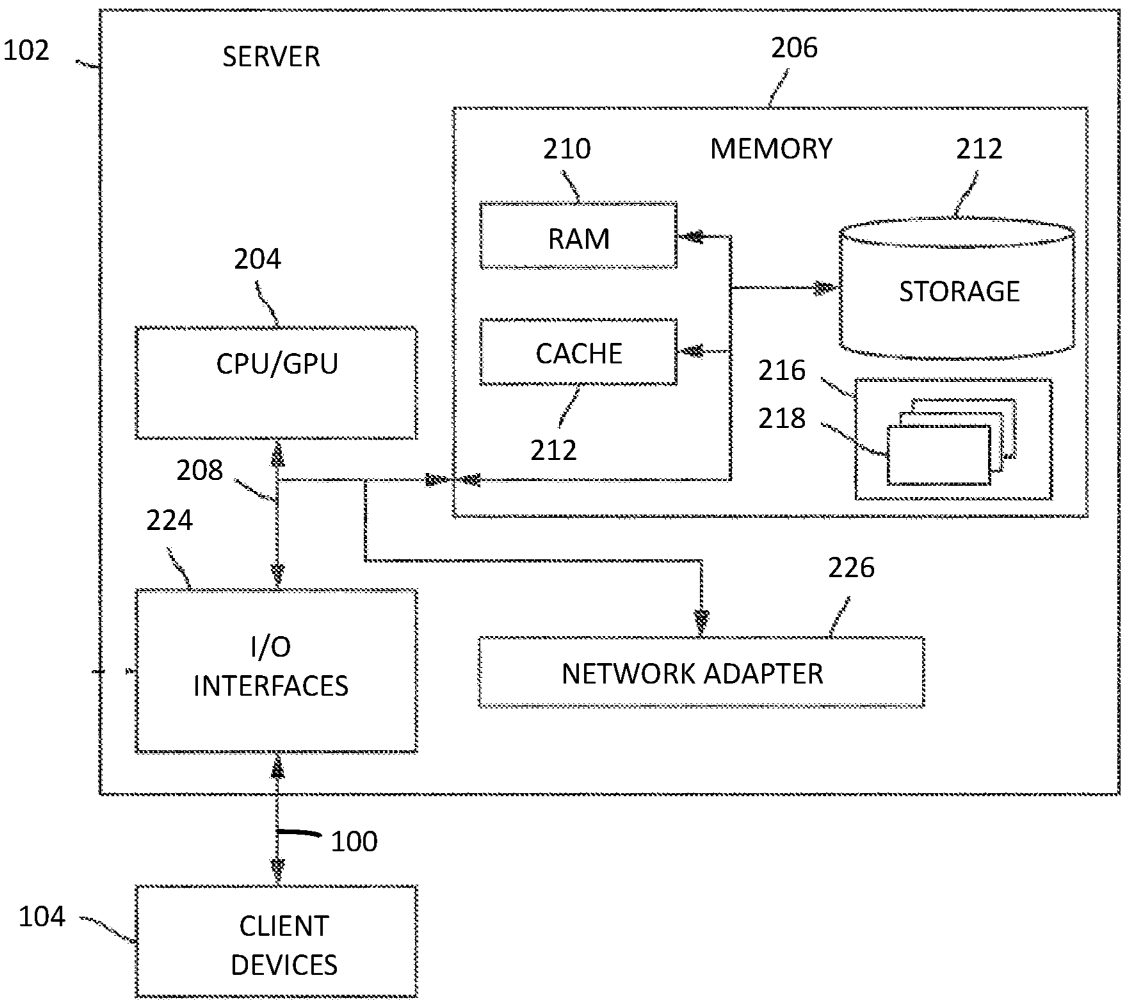
FIG. 1 is a diagram of a server computer according to embodiments of the invention.

The present invention relates to systems and methods that provide for real-time collaboration amongst users working with a visual object that is rendered by a graphical rendering program.

As used herein, a "graphical rendering program" means a software application that uses computer graphics techniques to generate visual representations of objects. Such representations are often called models, renderings (e.g., mesh rendering, volume rendering, raytracing), and animations, and such terms are equivalent for purposes of this specification. General examples of graphical rendering programs are computer aided design (CAD), 3D modeling software, and gaming software. Specific examples of graphical rendering programs are made by Autodesk 3ds Max made by Autodesk, Inc. of Mill Valley, U.S.; Unity made by Unity Software Inc. of San Francisco, U.S.; V-Ray made by Chaos of Karlsruhe, Germany; and SolidWorks made by Dassiult Systèmes of Vélizy-Villacoublay, France. Those skilled in the art will recognize numerous other examples of graphical rendering programs.

It should be noted that although the term "visual object" is used in this specification to refer to an output content of graphical rendering program, the term is not limited to a singular object. Rather, the term encompasses a plurality of objects output by a graphical rendering program, such as in a rendered/animated scene. A visual object as used herein may be two-dimensional, or a visual object may comprise additional data to provide a three-dimensional object, e.g., accommodating depth perception and stereoscopic nature of the content.

A graphical rendering program determines an application state that defines all of the aspects that are used to render the visual object, such as the object's geometry, the velocity of the object, the position of an object in a three-dimensional environment, etc. A graphical rendering program typically determines the application state by tracking and managing various parameters and data related to the rendering process. The specific process of determining the application state can vary depending on the design and implementation of the graphical rendering program. Such processes of determining the application state often involve a scene description defining the objects, materials, visibilities, lights, cameras, and other relevant elements in the virtual environment, data structures to represent the scene and its components, object transformations, camera and viewpoint settings, among others.

A graphical rendering program generates views of the visual object based on the application state. The generation process may include, for example, object retrieval, space transformation, frustum culling, vertex processing, clipping, projection, rasterization, fragment processing, depth testing, and other processing steps. The one or more views of the visual object include all of the data necessary to display the visual object.

Systems and methods according to embodiments of the invention use a computer network that includes a server (or multiple servers) and clients. Such networks are well-known in the art. The server acts as a central hub that manages and provides resources, services, and data to the clients. The clients communicate with the server to request information, share files, and/or access shared resources. The server handles these requests, processes the data, and distributes the results back to the clients. As will be described below, in embodiments of the invention a graphical rendering program is provided as a resource on a server computer to client computer devices.

FIG. 1 shows a network connection 100 between a server computer 102 and client computer devices 104 that can be used in embodiments of the invention. The components of the computer server 102 may include, but are not limited to, one or more processors or processing units 204, a system memory 206, and a bus 208 that couples various system components including system memory 206 to processor 204. In many instances, the one or more processors include both a central processing unit (CPU) and a graphical processing unit (GPU), as are well known in the art. Bus 208 represents one or more of any of several types of bus structures, including a memory bus or memory controller, a peripheral bus, an accelerated graphics port, and a processor or local bus using any of a variety of bus architectures. By way of example and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer server 102 typically includes a variety of computer system readable media. Such media may be any available media that is accessible by computer server 502, and it includes both volatile and nonvolatile media, removable and non-removable media.

The system memory 206 can include computer system readable media in the form of volatile memory, such as random-access memory (RAM) 210 and/or cache memory 212. Computer system/server 202 may further include other removable/non-removable, volatile/non-volatile computer system storage media. By way of example, storage system 212 can be provided for reading from and writing to a non-removable, non-volatile magnetic media (e.g., a hard drive). Although not shown, a magnetic disk drive for reading from and writing to a removable, non-volatile magnetic disk, and an optical disk drive for reading from or writing to a removable, non-volatile optical disk such as a CDROM, DVD-ROM, or other optical media can be provided. In such instances, each can be connected to bus 208 by one or more data media interfaces. The memory 206 may include at least one program product having a set (at least one) of program modules that are configured to carry out the functions of various embodiments as described herein.

Program/utility 216, having program modules 218, may be stored in memory 206 by way of example, and not limitation, as well as an operating system, one or more application programs, other program modules, and program data. Each of the operating system, one or more application programs, other program modules, and program data or some combination thereof, may include an implementation of a networking environment. As discussed herein, in embodiments of the invention, the program/utility 216 includes a graphical rendering program that provides a visual object such that a plurality of users can work with the visual object collaboratively in real-time.

Aspects of the various embodiments described herein may be embodied as a system, method, component, or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

The computer server 102 is configured to communicate with one or more clients in the form of computer devices 104 that are connected to the computer system/server 102 by the network 100. Details of the computer devices will be described below. The communication can occur via I/O interfaces 224 of the computer server 102 and interfaces on the client computer devices 104. In embodiments of the invention, the system is implemented as a cloud computing network in the form of infrastructure as a service (IaaS). That is, the computer server 102 provides on-demand computing resources to the connected client computer devices 104. Those skilled in the art will appreciate, however, that the system 100 could take on a wide variety of form in addition to, or in the alternative to, the embodiment depicted in FIG. 1. For example, the system could be configured to communicate with networks such as a local area network (LAN), a general wide area network (WAN), and/or a public network via network adapter 226. As depicted, network adapter 226 communicates with the other components of computer system/server 102 via bus 208.

It should be noted that while a single server computer 102 is depicted as being connected to client computer devices 104 in FIG. 1, and while a server computer being connected to client computer devices will be described below, in embodiments of the invention additional proxy/helper servers and clients may be used to facilitate communication between a main server and client computer devices interacting with the main server. Such proxy/helper servers are well-known in the art.

Figure 2:
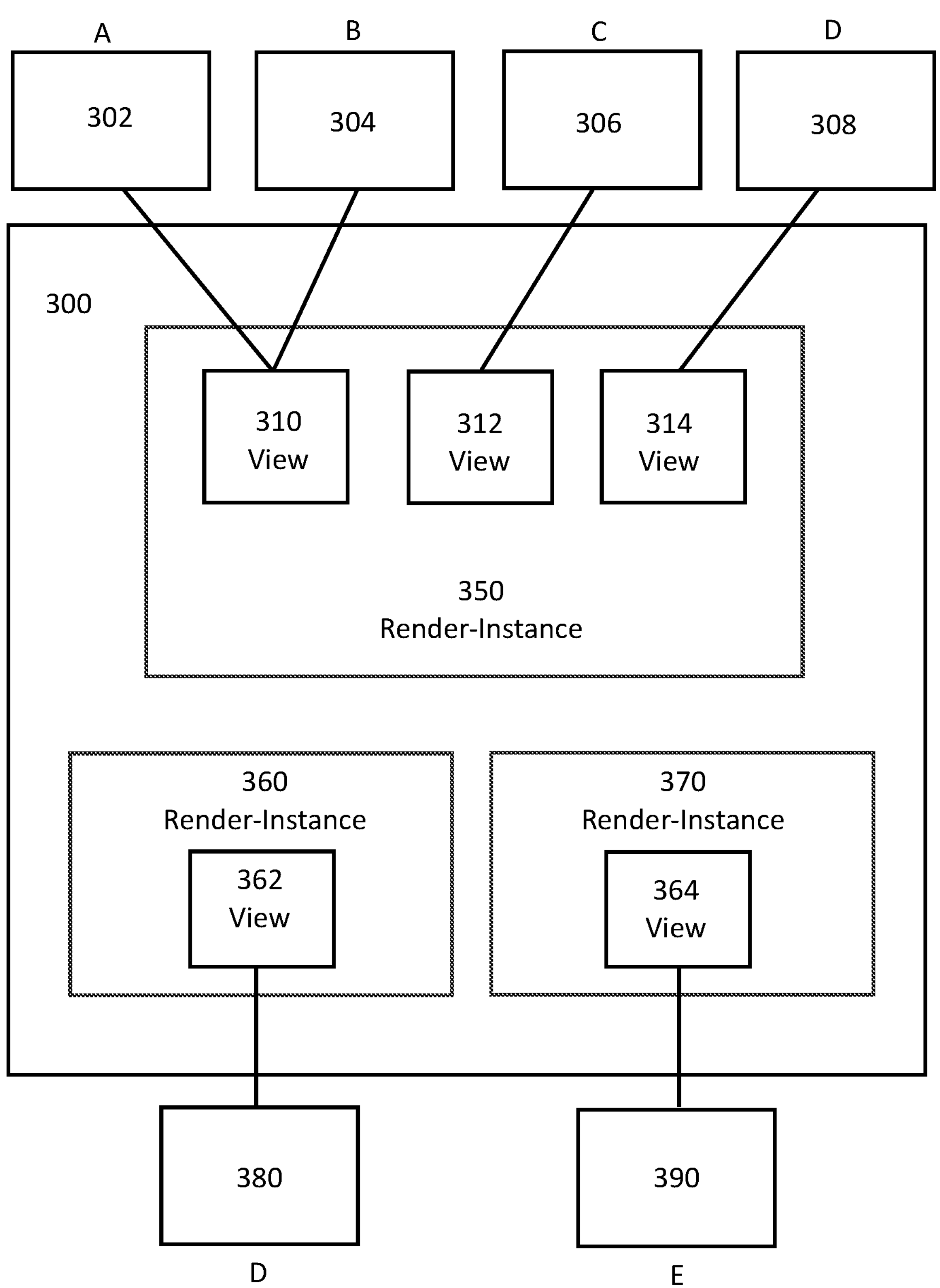
FIG. 2 is a block diagram of a system according to embodiments of the invention.

FIG. 2 is a block diagram showing details of a system according to embodiments of the invention. In these embodiments, cloud computing architecture is used to allow a plurality of users A, B, C, and D to view a render-instance 350 of a visual object that is generated by a graphical rendering program being executed by the server 300. As will be explained below, the render-instance 302 is a stateful rendering environment of the graphical rendering program in the memory of the server 300 that may be deployed using a containerize service. An application state is determined by the graphical rendering program for the render-instance 350, and views 310, 312, and 314 of the visual object are generated from the application state.

Users A, B, C, and D interact with the graphical rendering program being executed on the server 300 using client computer devices 302, 304, 306, and 308, which are connected to the server 300 through a network. Because the views 310, 312, and 314 of the visual object are generated by the server 300 and not the client computer devices 302, 304, 306, and 308, the client computer devices 302, 304, 306, and 308 may take a wide variety of forms. For example, one or more of the client computer devices 302, 304, 306, and 308 may be thin client computers, which are configured with minimal hardware components and rely on network connectivity to access applications and data. In other embodiments, one or more of the client computer devices 302, 304, 306, and 308 are personal computers (PCs) such as desktop or laptop computers. As other examples, one or more of the client computer devices 302, 304, 306, and 308 can be a smartphone, a tablet, an augment reality/virtual reality device, and/or an internet of things (IoT) device. One or more of the client computer devices 302, 304, 306, and 308 could also be a specialized computing device. An example of such a specialized computing device in the context of dentistry is a milling machine, which is a specialized computer-aided manufacturing device used to fabricate dental prostheses such as crowns, bridges, veneers, and dental implant restorations. Those skilled in the art will recognize the numerous types of devices that could be used as client computer devices 302, 304, 306, and 308.

The client computer devices 302, 304, 306, and 308 communicate with the server 300 using a transmission protocol that allows for rendering data for views of the visual object to be transmitted from the server 300 to the computers 302, 304, 306, and 308 through a network. In an example embodiment, the rendering data is sent to the client computer devices 302, 304, 306, and 308 from server 300 using WebRTC as the transmission protocol. WebRTC is an open-source communication protocol providing for real-time communication via an application program interface. The client computer devices 302, 304, 306, and 308 in such embodiments receive the rendering data as a video stream and are configured to display the visual object in a browser on their user interfaces. Those skilled in the art will also recognize numerous other networking methods and transmission protocols that could be used to provide the data connection between the client computer devices 302, 304, 306, and 308 and the server 300. For example, as alternatives to WebRTC, WebSockets, Real-Time Transport Protocol (RTP) over User Datagram Protocol (UDP), secure reliable transport (SRT), and PC-over-IP (PCoIP) are known streaming technologies that could be used to provide the rendering data for the visual object from the server 300 to the computers 302, 304, 306, and 308.

It should be noted that although the rendering data being transmitted from the server 300 to the client computer devices 302, 304, 306, and 308 is referred to as video or a video stream in this embodiment, the rendering data could be provided in other forms and configurations. For example, the rendering data could be a single image, and the data could either compressed or uncompressed. Further, data could be associated with the visual object in addition to the data for rendering the display of the object. For example, the data sent from the server 300 to the client computer devices 302, 304, 306, and 308 could include audio data, motion data, data for producing vibrations, etc., in addition to the rendering data.

As discussed throughout this specification, one aspect of embodiments of the invention is that the graphical rendering program that generates the views 310, 312, and 314 of a visual object runs only on the server computer 300 and not on the client computer devices 302, 304, 306, and 308. That is, the graphical rendering program is executed using the processor(s) and memory hardware of the server computer 300 to determine the application state from which the views of the visual object are generated. Graphical rendering programs often require a large amount of computer hardware resources (e.g., processing power and memory) to determine the application state and corresponding views based on the application state. With the graphical rendering program being executed by the server computer 300 and not the client computers 302, 304, 306, and 308, the hardware resources are effectively shared by the users, thereby reducing operational costs. Moreover, the client computer devices 302, 304, 306, and 308 in embodiments of the invention do not need a GPU to effectively provide a display of the visual object because the visual object is generated using the hardware resources of the server 300 that includes one or more CPUs, one or more GPUs, or a combination of one or more CPUs and GPUs. As will be explained more fully below, executing the graphical rendering program on the server computer 300 also facilitates real-time collaboration.

In the embodiment depicted in FIG. 2, the computer devices 302 and 304 of users A and B receive the view 310, the computer device 306 of user C receives the view 312, and the computer device 308 of user D receives the view 314. As a specific example of implementation, a graphical rendering program is used in the embodiment depicted in FIG. 2 to generate a model of human teeth. The application state in such a case defines all aspects of the model teeth, and views are generated from the application state. Different views of the model teeth are produced, with one view of the teeth being directed to a top side, another view being directed to the left side, and another view being directed to bottom side of the model. Thus, if users A, B, C, and D were using the system 300 to view the model of human teeth, a view directed at the top side of the model can be provided to the computer devices 302 and 304 of users A and B, a view directed at the left side of the model can be provided to the computer device 306 of user C, and the view directed at the bottom side of the model can be provided to the computer 108 of user D.

Figure 3:
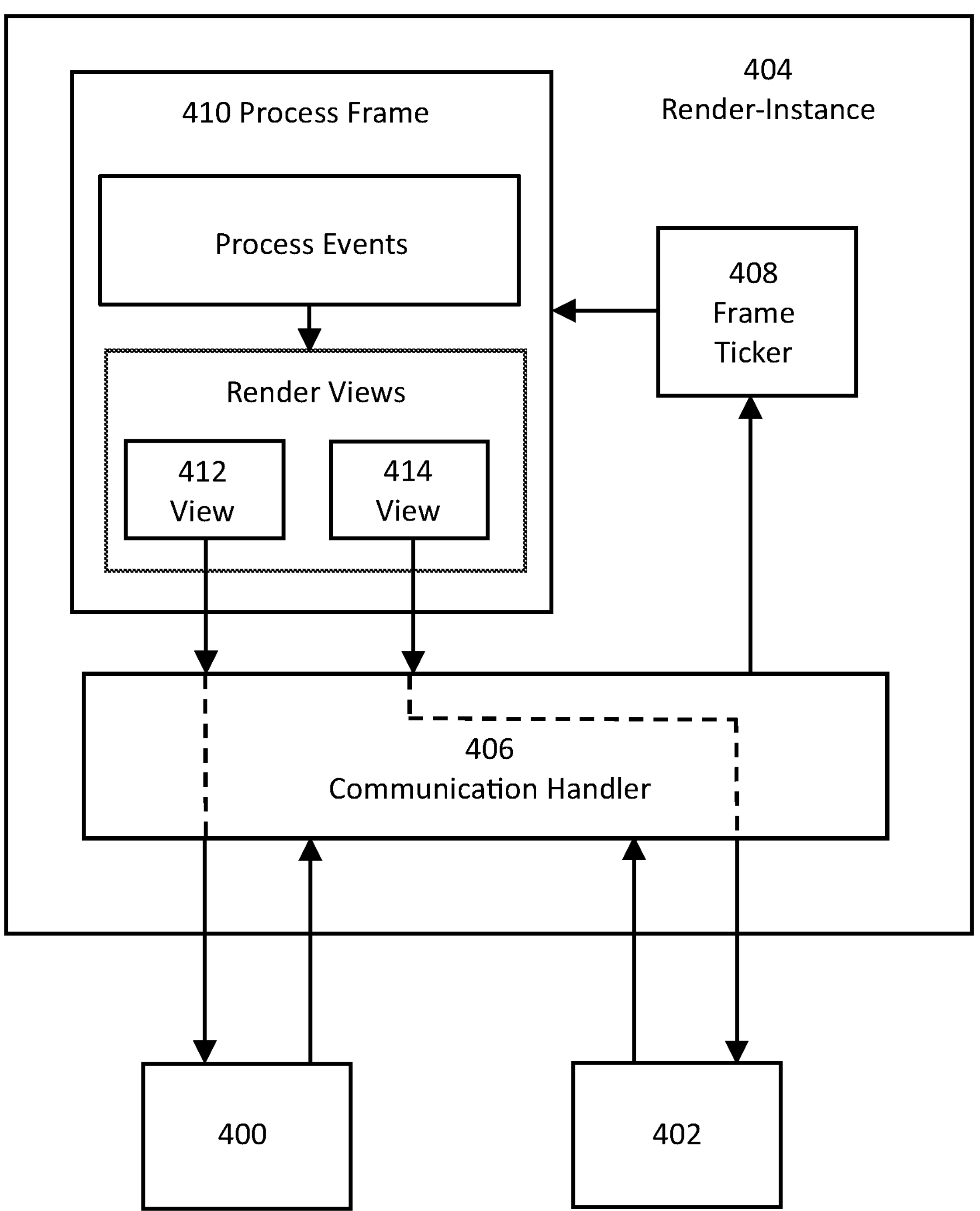
FIG. 3 shows details of the system shown in FIG. 2.

FIG. 3 shows details of how users of client computer devices 400 and 402 interact with the render-instance 404 of the graphical rendering program on a server computer and how views of the visual object are generated in the render-instance 404. When the graphical rendering program is initiated for viewing a visual object, the render-instance 404 process is started in the memory of the server. A communication handler 406 is provided for the render-instance 404, with the communication handler 406 managing the exchange of data to and from the client computer devices 400 and 402. As such, the render-instance 404 provides for connection with the client computer devices 400 and 402. A frame ticker 408 is provided for the render-instance 404. The frame ticker decides when a process frame 410 is executed based on a user interaction received from a connected client computer or on a fixed time interval (e.g., when the visual object is a simulation). A process frame 410 is created for the render-instance, with the process frame processing events (e.g., signals such as changes of data received from client computers) to determine the application state, from which the views of the visual object are generated. Two views 412 and 414 of the visual object are rendered and encoded. The rendering data for view 412 is sent to the client computer device 400 by way of the communication handler 406, and the rendering data for view 414 is sent to the client computing device 402 by way of the communication handler 406.

As also shown in FIG. 3, the client computer devices 400 and 402 are connected to the render-instance 404 such that user input (e.g., from mouse movement, a touch screen interaction, user interface interactions, etc.) may be sent from the client computer devices 400 and 402 to the communication handler 406 of the render-instance 404. Such user input may change the application state such new views are generated and new rendering data for the changed visual object is transmitted to the client computer devices 400 and 402.

The application state of the render-instance shown in FIG. 3 is effectively shared by the users of client computer devices 400 and 402; in other words, both views 412 and 414 are determined from the same data in the memory of the server. This aspect of embodiments of the invention is advantageous in comparison to prior art wherein at least a part of the application state is determined at multiple client computers. When an application state is determined by multiple client computers, synchronization of the application state amongst the client computers can be difficult. For example, if a user effects a change to the application state at one client computer, the change must propagate through the network to the other client computers, and then each client computer device must process the change in the application state before all of the client computer devices become synchronized to the changed application state. The time to exchange the application state change data from one client to the others, in combination with different client computer devices have different hardware resources available at any given time to process the application state change results will often lead to significant latency in implementing the application state change. Such latency can be frustrating where users are attempting to collaborate in real-time. On the other hand, when one of the users in FIG. 3 initiates a change to the visual object, the application state determining the views of the visual object is immediately changed, and the ensuing views of the changed visual object are sent to the two users at the same time. Thus, real-time collaboration with the visual object is made possible.

Referring again to FIG. 2, in addition to the above-described render-instance 350, further render-instances 360 and 370 are generated on the server 300. Each render-instance is an individual rendering process of the graphical rendering program to handle a specific scene of visual object based on an application state. The render-instances 360 and 370 may provide views 362 and 364 to client computer devices 380 and 390 of users E and F of different application states of the visual object(s). One of all of render-instances 350, 360, and 370 may provide views of a different visual objects. In this way, the hardware resources of the server 300 can be shared to provide different application states and/or visualizations of different objects to multiple users.

In embodiments of the invention, the graphical rendering program service is deployed as a containerized service on the server. As will be recognized by those skilled in the art, a container service is a software platform that enables deployment, management, and orchestration of applications (in this case, the application being a graphical rendering program). Each container runs as an isolated process by bundling configuration files, libraries, and dependencies. Containerization technology is widely adopted for many cloud computer platforms. In embodiments of the invention, Kubernetes, maintained by the Cloud Native Computing Foundation, is used as the container orchestration system. When using a containerized service, each render-instance of the graphical rendering program is provided in a container on the server computer.

A method according to embodiments of the invention will now be described. The method may be performed using a server computer and client computer devices as described herein. The method begins with a first user using a client computer device to initiate a graphical rendering program on a server computer. A render-instance of the graphical rendering program is started on the server, with the render-instance being a process in the memory of the server computer. The graphical rendering program may be deployed using a container service such that the render-instance is in a container on the server computer. The user is thereby connected to the render-instance.

Next, a second user connects to the render-instance being deployed on the server computer. The graphical rendering program determines an application state for a visual object that is requested by one of the users, and the render-instance generates rendering data for one or more views of the visual object based on the application state. The rendering data for the view(s) of the visual object is transmitted to the client computer devices of the first and second users. The visual object is then displayed on a display device of the client computer devices based on the rendering data.

The method also includes one of the users generating from one of the client computer devices a command for changing the application state. The command is transmitted from one of the client computer devices to the server computer. The changed application state is then determined by the graphical rendering program in the render-instance in the server computer. New rendering data is generated for view(s) of the visual object based on the changed application state. The new rendering data is then sent from the server computer to the client computer devices, and the client computer device displays the updated view(s) of the visual object.

In embodiments of the invention, the method can include further steps such as one of the users inviting further users to connect to the render-instance on the server computer. In this way, a group of users may work collaboratively on a project involving a visual object.

Still further features may be provided to systems, apparatus, and methods according to embodiments of the invention. One such feature is that the client computer devices may be provided with the functionalities to add features of the visual object displayed from the rendering data. For example, the client computer devices may be provided with one or more program modules that allow the user to define other aspects of the visual object, such as camera views, other materials, visibilities, etc. Such custom visualization add-ons may be only processed for one user and not provided to the other client computer devices that are connected to the render-instance. Another aspect is that one of the client computer devices could function as a sole controller of the application state of the graphical rendering program being executed on the server computer. In such a case, the other client computer devices may be able to receive rendering data of the visual object from the render-instance, but the other client computer devices are not permitted to issue commands changing the application state.

The embodiments of the invention described herein provide numerous advantages and advances over the prior art. One advantage is that large changes to an application state of a graphical rendering program is completed such that displays of the visual object on all client computer devices are updated in real-time, i.e., the time it takes to create the rendering data at the server computer after initiating of the application state change and the time to send the changed rendering data to the client computer devices. Unlike prior art, there is no need to synchronize application states of graphical rendering programs at each client computer device, and, thus, there is no risk of desynchronization. Moreover, there is no need to exchange data from one client computer device to another client computer device. Still further, there is no need to provide software updates to client computer devices. Embodiments of the invention thereby provide for real-time collaboration with a graphical rendering program.

While various example embodiments of the invention have been described above, it should be understood that they have been presented by way of example, and not limitation. It is apparent to persons skilled in the relevant art(s) that various changes in form and detail can be made therein. Thus, the invention should not be limited by any of the above-described example embodiments, but should be defined only in accordance with the following claims and their equivalents.

In addition, it should be understood that the figures are presented for example purposes only. The architecture of the example embodiments presented herein is sufficiently flexible and configurable, such that it may be utilized and navigated in ways other than that shown in the accompanying figures.

Further, the purpose of the Abstract is to enable the general public, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

The invention claimed is:

1. A system for providing a visual object, the system comprising:

- a server computer comprising at least one processor and at least one memory that are configured to execute a graphical rendering program, the graphical rendering program determining an application state that defines the visual object, with rendering data for one or more views of a visual object being generated based on the application state;
- a first client computer device including a display device, at least one processor, and at least one memory, the first client computer device being connected to the server computer through a network such that the first client computer device can receive the rendering data from the server computer, the first client computer device being configurable to provide a display of the visual object on the display device based on the rendering data received from the server computer without determining an application state for the visual object; and
- a second client computer device including a display device, at least one processor, and at least one memory, the second client computer device being connected to the server computer through the network, the second client computer device being configurable to provide a display of view of the visual object on the display device based on the rendering data received from the server computer without determining an application state for the visual object, wherein the server computer is configured to provide the application state of the graphical rendering program as part of a plurality of render-instances, each of the plurality of render-instances including respective application states for respective visual objects, and each render-instance being a process in the at least one memory of the server computer, and providing for connection with the first and second computer devices such that (i) the rendering data is transmitted to the first and second computer devices, and (ii) commands to change the application state are received by a render-instance of the plurality of render-instances from at least one of the first and second computer devices, and wherein each of the plurality of render-instances is deployed on the server computer as a container that executes in an operating-system-level virtualized environment providing isolated namespaces and resource control for a respective render-instance.

2. The system according to claim 1, wherein at least one of the first client computer device and the second client computer device is configured to transmit commands for changing the application state to the server computer, and wherein the server computer is configured to receive the commands for changing the application state from the first client computer device and/or the second client computer device and to change the application state based on the received commands.

3. The system according to claim 1, wherein at least one of the first client computer device and the second client computer device is configured to transmit a command to initiate the graphical rendering program on the server computer.

4. The system according to claim 1, wherein the rendering data is transmitted to the first and second client computer devices as a video stream or as at least a single image.

5. A server computer comprising:

at least one processor configured to read out and execute instructions stored in at least one memory to thereby cause the server computer to:

execute a graphical rendering program that determines an application state that defines a visual object;

generate rendering data for one or more views of a visual object based on the application state, the rendering data being such that a client computer device can display the visual object without the client computer device determining the application state;

transmit the rendering data to a plurality of client computer devices; and receive commands from at least one of the plurality of client computer devices to change the application state, wherein the server computer is configured to provide the application state of the graphical rendering program as part of a plurality of render-instances, each of the plurality of render-instances including respective application states for respective visual objects, and each render-instance being a process in the at least one memory of the server computer, and providing for connection with the plurality of client computer devices such that (i) the rendering data is transmitted to the plurality of client computer devices, and (ii) commands to change the application state are received by a render-instance of the plurality of render-instances from at least one of the plurality of client computer devices, and wherein each of the plurality of render-instances is deployed on the server computer as a container that executes in an operating-system-level virtualized environment providing isolated namespaces and resource control for a respective render-instance.

6. A system comprising:

the server computer according to claim 5;

a first client computer device including a display device, at least one processor, and at least one memory, the first client computer device being connected to the server computer through a network such that the first client computer device can receive the rendering data from the server computer, the first client computer device being configurable to provide a display of the visual object on the display device based on the rendering data received from the server computer without determining an application state for the visual object; and a second client computer device including a display device, at least one processor, and at least one memory, the second client computer device being connected to the server computer through the network, the second client computer device being configurable to provide a display of view of the visual object on the display device based on the rendering data received from the server computer without determining an application state for the visual object.

7. A method of providing displays of a visual object on computer devices, the method comprising:

initiating a graphical rendering program on a server computer, the server computer comprising at least one processor and at least one memory that are configured to execute the graphical rendering program, the graphical rendering program determining an application state for the visual object;

generating rendering data for one or more views of the visual object based on the application state;

transmitting the rendering data to a first client computer device and a second client computer device; and displaying a view of the visual object on display devices of the first and second client computer devices without the first and second client computer devices determining an application state for the visual object, wherein the server computer is configured to provide the application state of the graphical rendering program as part of a plurality of render-instances, each of the plurality of render-instances including respective application states for respective visual objects, and each render-instance being a process in the at least one memory of the server computer, and providing for connection with the first and second computer devices such that (i) the rendering data is transmitted to the first and second computer devices, and (ii) commands to change the application state are received by a render-instance of the plurality of render-instances from at least one of the first and second computer devices, and wherein each of the plurality of render-instances is deployed on the server computer as a container that executes in an operating-system-level virtualized environment providing isolated namespaces and resource control for a respective render-instance.

8. The method according to claim 7, further comprising: transmitting a command for changing the application state from the first client computer device or the second client computer device to the server computer, and changing the application state based on the command.

9. The method according to claim 7, further comprising: sending an invitation to connect to the render-instance from one of the first and second client computer devices to a third computer device; and connecting the third computer device to the render-instance.

10. The method according to claim 7, wherein the rendering data is transmitted to the first and second client computer devices as a video stream or at least a single image.

11. The method according to claim 7, wherein at least one of audio, data for rendering three-dimensional video stream or at least one three-dimensional image, motion data, and data for producing vibrations is transmitted to the first and second client computer devices.

* * * * *